May 3, 1949.  J. LUBBOCK  2,468,885
PIPE JOINT
Filed March 20, 1946

Inventor
John Lubbock, Lord Avebury
By Baldwin, Wight, & Prevost
his ATTORNEYS

Patented May 3, 1949

2,468,885

UNITED STATES PATENT OFFICE 2,468,885

PIPE JOINT

John Lubbock, London, England

Application March 20, 1946, Serial No. 655,820
In Great Britain February 2, 1945

Section 1, Public Law 690, August 8, 1946
Patent expires February 2, 1965

1 Claim. (Cl. 285—90)

This invention relates to fluid-tight seals for connecting a pipe or tube and a union member.

A fluid-tight seal according to the present invention comprises a sleeve of elastic material, which normally has an internal diameter smaller than the external diameter of the pipe or tube, a comparatively rigid expander member having a larger diameter than that of the pipe or tube, and a casing surrounding the sleeve and expander member and provided at one end with an extension so that the casing also acts as part of the union member, the sleeve being doubled on itself to form recesses between the walls of which the expander member is sandwiched, the casing being so dimensioned with respect to the expander member that that portion of the sleeve which lies between the said casing and expander is always under compression diametrically.

The extension on the casing may be provided either with an internal or external thread for engagement with a co-operating thread on the other member completing the union, or the said extension may terminate in a flange to be bolted or otherwise secured to said member.

Figure 1:
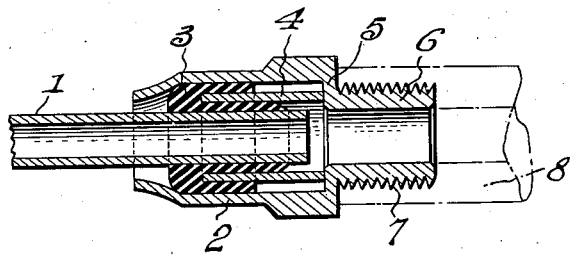
Figure 2:
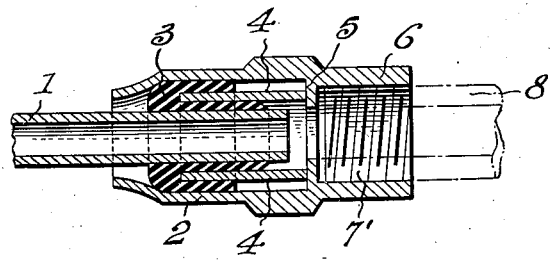
Figure 3:
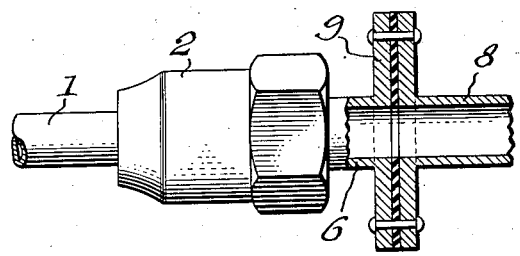

Three forms of the invention are illustrated in the accompanying drawing in which Figures 1 and 2 are sections of different forms and Figure 3 a sectional elevation of another form.

Referring to the drawing, the fluid-tight seal comprises a pipe or tube 1 which is inserted within a casing 2. Surrounding the end of the pipe 1 within the casing is a sleeve 3 of elastic material, one end of which is of tapered formation. The sleeve is preferably formed of rubber or like mouldable elastic material and one or both ends may be chamfered or of stepped section instead of being tapered as shown. Again, if desired, the sleeve, before assembly, may be turned inside out as described in my co-pending complete specification No. 2731/45.

The sleeve 3 is doubled on itself as shown and a comparatively rigid expander member 4 is sandwiched between the two layers of the sleeve 3.

An abutment 5 is provided within the casing 2 for that end of the expander member 4 which lies towards an extension 6 on the casing, and may be so arranged as to locate that end of the expander radially as well as axially. The extension 6 is externally threaded as at 7 for connection with a member 8 completing the union. The end of the casing opposite to the screw-threaded extension 6 is preferably reduced in diameter or flanged or flared inward as shown in Figures 1, 2 or 3, in such a manner as to prevent the withdrawal of the expander sleeve assembly.

As shown in Figure 2 the extension 6 is internally threaded as at 7' instead of having an external thread as shown in Figure 1.

In Figure 3 the extension 6 terminates in a flange 9 which may be bolted, riveted or otherwise secured to the member 8.

The dimensions of any of the component parts may be so arranged relative to the size of the pipes and to each other as to allow access for the fluid pressure to a space formed thereby between the inner surface of the expander member and the outside of that portion of the sealing sleeve which lies within the expander.

What I claim is:

A fluid-tight seal for connecting a pipe and a union member, comprising a cylindrical sleeve of elastic material normally of substantially uniform diameter from end to end embracing one end of said pipe and having an internal diameter normally smaller than the external diameter of the latter, a comparatively rigid expander member having a larger diameter than that of the pipe and adapted to surround the end of said pipe with a portion of said sleeve interposed therebetween, said sleeve being turned back on itself to overlie a portion of said expander member, and a casing surrounding said turned back sleeve and expander member and provided at one end with an extension forming a part of said union member, the casing being so dimensioned with respect to said expander member that that portion of the sleeve which lies between the casing and exander is always under compression diametrically.

JOHN LUBBOCK.

REFERENCES CITED

The following references are of record in the file of this patent:

UNITED STATES PATENTS

| Number | Name | Date |
|---|---|---|
| 795,976 | Herrick | Aug. 1, 1905 |
| 943,123 | Reynolds | Dec. 14, 1909 |
| 1,894,711 | Schacht | Jan. 7, 1933 |